United States Patent Office 3,179,437
Patented Apr. 20, 1965

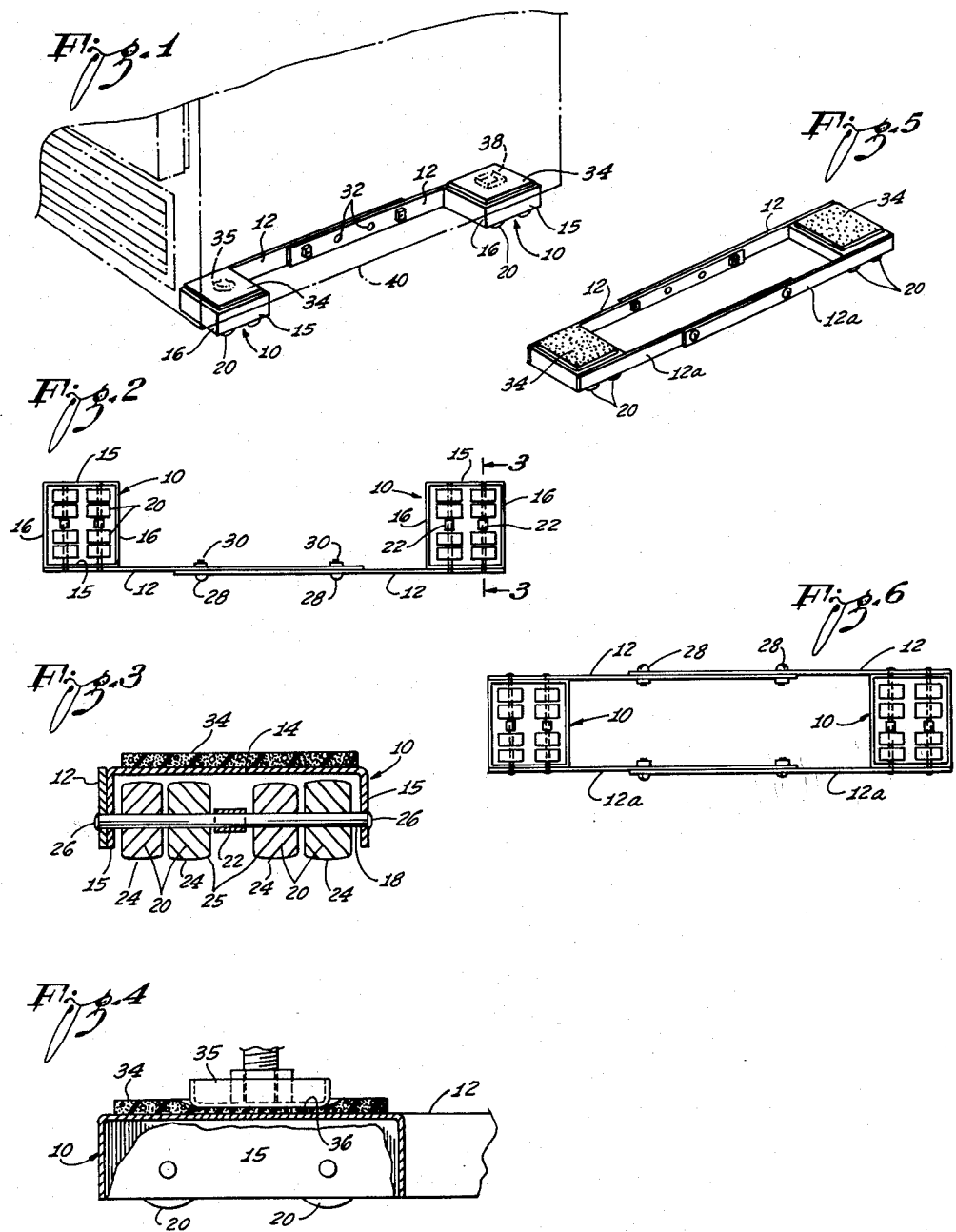

3,179,437
DOLLY
Chester B. Ensinger, Woodland Hills, Calif., assignor of one-half to Matthew M. Radernacher, Monterey Park, Calif.
Filed Jan. 27, 1964, Ser. No. 340,259
12 Claims. (Cl. 280—35)

This invention relates to dollies for lending mobility to relatively heavy household appliances such as refrigerators, free standing kitchen ranges, freezers, washers, dryers or the like, and is specifically directed to the construction of a dolly to be installed under such household devices permanently to make it easy to move the devices whenever desired.

Refrigerators, kitchen ranges and the like are so heavy and awkward to handle that they are commonly left in fixed position indefinitely. They present a problem, therefore, because it is exceedingly difficult to clean under and behind the appliances, especially when close to the wall of a room.

The general object of the invention is to meet this problem by providing a dolly that is of inexpensive, adjustable construction for sale to householders as an accessory device to make a heavy appliance readily movable within the strength of an average person.

The problem of providing a dolly of inexpensive construction is met, in part, by using standard steel stock for a construction of a pair of cooperating dollies that may be produced on a mass basis by simple operations. Thus each dolly of the pair includes two small wheel housings which are simply rectangular pieces of sheet metal flanged on four sides. The two housings are interconnected by overlapping pieces of bar stock. Each housing is provided with a plurality of transverse axles which carry wheels for rolling support of an appliance and the axles are made of standard round rod stock.

A further feature with respect to economy is that the transverse axles serve more than their primary purpose of journaling wheels. The axles mechanically interconnect the opposite sides of each of the wheel housings to lend rigidity to the housing and in addition the axles attach the two interconnecting bars to the two housings respectively. For this latter purpose each axle extends through opposite side walls of a wheel housing and also extends through an associated interconnecting bar, the outer ends of the axles being peened or staked to unify the assembly.

With further reference to economy, a feature of the invention is an inexpensive means to prevent slippage or shifting of the dolly relative to the appliance that it supports. Various types of hangers, clips, clamps and the like have been used for this purpose heretofore. The invention meets this problem by bonding a resiliently deformable plastic or rubber pad to the upper surface of each of the two wheels housings. When a portion of an appliance such as a corner structure or a leveling screw is imposed on the resilient pad, the pad yields locally and thus forms a depression to seat and effectively engage or lock the base portion of the appliance to the dolly.

Another feature of the invention relates to the fact that it is often desirable to apply lifting force to a bottom edge of an appliance along one side thereof to tilt the appliance for the purpose of placing a dolly under the appliance near the bottom edge. Unfortunately, when a jack or other lifting device engages the bottom edge for this purpose it interferes with the dolly since it occupies space that must be occupied by the installed dolly. The preferred practice of the invention meets this problem by interconnecting the two wheel housings on one side only in such manner that the dolly straddles the space occupied by a lifting device.

A further feature of the invention relates to the well known fact that a dolly for this purpose tends to mark or indent a floor surface, especially a floor surface made of plastic materials. This tendency has been eliminated by a number of provisions. In the first place, each of the wheel means that spans the interior of a wheel housing is of a relatively large axial dimension, the axial dimension being more than two times the diameter of the wheel means, for substantial lateral distribution of the imposed weight. A second provision is to divide each wheel means on an axle into a series of separate axially spaced wheel members each of less axial dimension than its diameter. A third provision is to slightly crown each of the wheel members so that each wheel member is of maximum diameter at the midpoint of its axial dimension and tapers slightly in both directions from its maximum diameter. Thus the minimum diameter of each wheel is at its opposite circumferential side edges where floor damage usually tends to occur. A fourth provision is to round each of the two opposite circumferential side edges of each of the wheel members to avoid the presence of relatively sharp edges. A fifth provision is to mount the plurality of wheel means in each dolly in two spaced housings which are interconnected by bars that are capable of yielding in torsion. Thus when a floor surface is uneven, the two housings are free to rock relative to each other to follow the uneven surface. It has been found that with these provisions an appliance may be repeatedly moved back and forth on a finished floor with no evidence of any floor damage.

The features and advantages of the invention may be understood from the following detailed description together with the accompanying drawing.

In the drawing, which is to be regarded as merely illustrative:

FIG. 1 is a perspective view of the preferred embodiment of the invention, the view showing in phantom how a refrigerator base or leveling screws rest on the dolly;

FIG. 2 is a bottom plan view of the dolly shown in FIG. 1;

FIG. 3 is an enlarged transverse section along the line 3—3 of FIG. 2;

FIG. 4 is an enlarged side elevational view of a wheel housing with a resilient pad thereon shown in section, the view indicating how the resilient pad forms a seat for a leveling screw of a refrigerator or other heavy appliance;

FIG. 5 is a perspective view of a second embodiment of the invention; and

FIG. 6 is a bottom plan view of the second embodiment of the invention.

In the first embodiment of the invention shown in FIGS. 1 to 4, each of the two dollies that cooperate to support a heavy appliance comprises two wheel housings, each generally designated 10, joined together in spaced relation by suitable interconnecting means which, in this instance, is in the form of two overlapping metal connecting bars 12 that are capable of yielding in torsion. Each of the wheel housings 10 is of the configuration of an inverted rectangular box which may be fabricated simply by notching a rectangular piece of heavy sheet metal at its four corners and then bending the metal to form four flanges on its four sides respectively. Thus each wheel housing 10 has a top wall or platform 14, two oppositely downwardly extending side walls 15 and two opposite downwardly extending end walls 16.

The interior of each wheel housing 10 is spanned by suitable axle means carrying suitable wheel means. In the present embodiment of the invention the axle means comprises two transverse axles 18 in the form of steel rods, the two axles being located on opposite sides of the midpoint of the top wall 14. Each of the wheel means which is of an axial dimension at least two times its diameter may comprise four separate rollers or wheel members 20 which are divided into two pairs separated by a central spacer sleeve 22.

As heretofore noted, the fact that the four wheels distribute the imposed weight laterally to substantial extent and the fact that the wheels are of the configuration shown as well as the fact that the interconnecting bars are yieldable in torsion result in elimination of any tendency for the wheel means to mark or indent a plastic floor surface. It can be seen in FIG. 3 that each of the wheels 20 is crowned in the sense of having a smoothly curved convex peripheral running surface 24. In addition, each of the two circumferential side edges of a wheel member 20 is rounded to a short radius as indicated at 25 in FIG. 3.

Each of the two axle rods 18 of each of the two wheel housings 10 extends through corresponding bores in the two side walls 15 of the wheel housing and in addition extends through bores in the metal bar 12 that is associated with the wheel housing. The two opposite ends of each of the axle rods may be peened, staked or riveted as indicated at 26 in FIG. 3 to unify the assembly that comprises the wheel housing, the metal bar and the axle rod. Thus each of the axle rods 18 not only serves as means to journal the four wheel members 20 but also serves to lend rigidity to the wheel housing and in addition serves the further purpose of, in effect, riveting the corresponding metal bar 12 to the wheel housing.

The two metal bars 12 are interconnected by spaced screws 28 and nuts 30 and to permit adjustable spacing of the two wheel housings 10, the two metal bars 12 are provided with sets of longitudinally spaced screw holes 32 which may be employed selectively to receive the screws. This adjustability permits the two wheel housings 10 to be spaced apart as required to support two corner base portions of an appliance.

Each of the two wheel housings 10 is provided with a resiliently yieldable pad 34 which is adhesively bonded to the upper surface of the top wall 14. Such a pad may be made of a suitable foam plastic such as neoprene sponge rubber, the pad being for example 3/16 or 1/4 inch thick and having a Shore hardness of approximately 30 to 45.

FIG. 4 shows how a leveling screw 35 at the front corner of a refrigerator is supported by a pad 34. The pad yields resiliently to form a depression 36 that seats the head of the leveling screw and surrounds the head. Thus the pad 34 effectively engages the head of the leveling screw from all sides to prevent horizontal slippage between the wheel housing 10 and the leveling screw. It is apparent that any configuration of a corner structure of an appliance will seat on the pad 34 in the same manner.

FIG. 1 shows how the dolly may be placed under one side of a refrigerator with the forward wheel housing supporting a leveling screw 35 and the rear wheel housing supporting an interior corner structure 38 of the refrigerator. It is to be noted in FIG. 1 that the two interconnecting bars 12 are spaced inward from the bottom edge of the refrigerator, the spacing being equal to at least the width dimension of the two wheel housings 10. Thus, the dolly straddles a space between the two wheel housings which is left free to accommodate a jack or other lifting device for engaging the bottom edge 40 for the purpose of tilting the refrigerator to receive the dolly.

The second embodiment of the invention shown in FIGS. 5 and 6 is largely identical with the first embodiment as indicated by the use of corresponding numerals to indicate corresponding parts. The second embodiment differs from the first embodiment solely in the addition of a second pair of interconnecting metal bars 12a which are identical with the metal bars 12.

My description of the preferred embodiments of the invention in specific detail will suggest various changes, substitutions and other departures from my disclosure within the spirit and scope of the appended claims.

I claim:

1. A dolly for use under a household appliance such as a refrigerator adjacent one side thereof, comprising:
   only two open-bottom housings, each housing having a top wall and two opposite side walls;
   axle means spanning the interior of each housing and interconnecting the side walls thereof;
   wheel means inside the housing carried by the axle means for rolling support of the housing, said wheel means having an overall axial dimension of more than twice its diameter to spread the weight that is transmitted by the wheel means;
   means fixedly connected to side walls of the two housings, respectively, and thus interconnecting the two housings, said interconnecting means being adjustable in length; and
   a pad fixedly mounted on the upper side of the top wall of each housing to receive the weight of a portion of the appliance near a corner of the appliance, said pad being of greater area than the corner portion and being resiliently deformable to yield to the weight of said portion and thereby form a recessed seat for engagement with the portion to prevent slippage of the housing relative to the portion.

2. A dolly as set forth in claim 1 in which the interconnecting means is yieldable in torsion to permit the two housings to rock relative to each other to follow an uneven floor surface.

3. A dolly as set forth in claim 1 in which said pad is made of foamed plastic.

4. A dolly as set forth in claim 1 in which said interconnecting means includes a pair of overlapping metal bars connected respectively to corresponding sides of the two housings, the overlapping portions of the two bars being adjustably interconnected.

5. A dolly as set forth in claim 4 in which said interconnecting means comprises two pairs of interconnecting bars, there being two bars rigidly mounted on the opposite sides respectively of each housing.

6. A dolly as set forth in claim 4 in which the interconnecting means comprises a single pair of overlapping bars mounted on the sides of the two housings that are furthest from said one side of the appliance to provide clearance for lifting means to engage the bottom of the appliance along said one side between the two housings.

7. A dolly for use under a household appliance such as a refrigerator adjacent one side thereof, comprising:
   two rectangular open-bottom housings, each having a rectangular top wall and two opposite side walls;
   at least two transverse axles spanning the interior of each housing on opposite sides of the center of the housing and interconnecting the two side walls of the housing;
   wheel means inside the housing carried by each of the axle means for rolling support of the housing, each of said wheel means having an overall axial dimension that is at least twice its diameter;
   means interconnecting the two housings, said interconnecting means being adjustable to variably space the two housings apart; and
   a pad fixedly mounted on the upper side of the top wall of each of the two housings to receive the weight of a portion of the appliance near a corner of the appliance, said pad being resiliently deformable to yield to the weight of said portion and thereby form a seat for engagement with the portion to prevent slippage of the housing relative to the portion, said pad being positioned centrally of the housing.

8. A dolly as set forth in claim 7 in which each of the wheel means comprises a plurality of axially spaced wheels.

9. A dolly as set forth in claim 8 in which each of said wheels is of maximum diameter at the midpoint of its axial dimension and tapers slightly both ways from its maximum diameter to minimize the tendency of the wheel to mark tracks in a floor surface.

10. A dolly as set forth in claim 7 in which said transverse axles of each housing extend through the interconnecting means as well as through the side walls of the housing and in which the opposite ends of the axles are enlarged to prevent withdrawal of the axle and to cause the axle not only to interconnect the two side walls of the housing but also to attach the interconnecting means to the housing.

11. A dolly as set forth in claim 1 in which each of said housings comprises a metal plate forming a rectangular top wall of the housing and flanged downward on two opposite sides to form said two opposite side walls of the housing, the metal plate being flanged downward on its remaining two opposite sides for stiffening the plate between the first mentioned two opposite side walls.

12. A dolly as set forth in claim 11 for use under a household appliance such as a refrigerator adjacent one side thereof, which appliance is provided with corner portions at its bottom which are offset downward below the remaining portion of the bottom of the appliance, in which the pad mounted on the upper side of the top wall of each of the housings is made of elastomeric material and is of greater area than a corner portion of the appliance.

References Cited by the Examiner
UNITED STATES PATENTS

| | | | |
|---|---|---|---|
| 781,243 | 1/05 | Thompson | 280—35 X |
| 1,258,573 | 3/18 | Johnstone | 152—7 |
| 1,717,358 | 6/29 | Adcock et al. | 280—35 |
| 2,472,952 | 6/49 | Lennard | 280—35 |
| 2,763,491 | 9/56 | Thorwaldson | 280—35 |
| 2,878,028 | 3/59 | Long | 280—35 |
| 3,061,327 | 10/62 | Ensinger | 280—35 |

ARTHUR L. LA POINT, *Primary Examiner.*